US011559051B2

United States Patent
Pulkrabek et al.

(10) Patent No.: US 11,559,051 B2
(45) Date of Patent: *Jan. 24, 2023

(54) BAITCASTER WITH INTERNAL GEAR SET

(71) Applicant: TrikaUSA Inc., Superior, WI (US)

(72) Inventors: Larry Pulkrabek, Superior, WI (US); Ty Warner, Superior, WI (US); Danny Uribe, Superior, WI (US); Ron Hedberg, Superior, WI (US)

(73) Assignee: TrikaUSA, Inc., Superior, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,867

(22) Filed: Mar. 1, 2021

(65) Prior Publication Data
US 2021/0176972 A1  Jun. 17, 2021

Related U.S. Application Data

(63) Continuation of application No. 17/072,902, filed on Oct. 16, 2020, now Pat. No. 11,154,042.

(60) Provisional application No. 62/916,458, filed on Oct. 17, 2019.

(51) Int. Cl.
*A01K 89/01* (2006.01)
*A01K 89/015* (2006.01)

(52) U.S. Cl.
CPC .................. *A01K 89/0183* (2015.05)

(58) Field of Classification Search
CPC ............. A01K 89/0183; A01K 89/015; A01K 89/0184; A01K 89/01931
See application file for complete search history.

(56) References Cited

U.S. PATENT DOCUMENTS

| 2,389,515 | A | * | 11/1945 | King | A01K 89/015 242/316 |
| 2,587,308 | A | * | 2/1952 | Gilette | B65H 75/4471 242/375.3 |
| 3,246,859 | A | * | 4/1966 | Martin | A01K 89/01931 242/259 |
| 3,448,942 | A | * | 6/1969 | Parks | A01K 89/015 475/326 |
| 4,871,129 | A | | 10/1989 | Hashimoto | |
| 5,560,562 | A | | 10/1996 | Hartmann | |
| 6,446,894 | B1 | | 9/2002 | Holma et al. | |

(Continued)

FOREIGN PATENT DOCUMENTS

| JP | H09294513 A | * | 5/1996 |
| JP | 2005117902 A | * | 5/2005 |

OTHER PUBLICATIONS

International Search Report and Written Opinion in PCT/US2020/056079 dated Jan. 15, 2021 (9 pages).

(Continued)

*Primary Examiner* — Emmanuel M Marcelo
(74) *Attorney, Agent, or Firm* — Foley & Lardner LLP

(57) ABSTRACT

A baitcaster for retrieving a fishing line includes a housing, a spool, and a compound gear set. The spool is positioned at least partially within the housing, defining an inner volume, and includes a spindle. The compound gear set is positioned at least partially within the inner volume of the spool. The compound gear set is configured to receive input mechanical energy from a first shaft and transfer output mechanical energy through a second shaft to drive the spool and thereby retrieve the fishing line.

20 Claims, 14 Drawing Sheets

(56) References Cited

U.S. PATENT DOCUMENTS 9,408,376 B2 8/2016 Ohara
2012/0318902 A1* 12/2012 Kawabe ............... A01K 89/033
242/298

OTHER PUBLICATIONS

U.S. Notice of Allowance on U.S. Appl. No. 17/072,902 dated Jun. 23, 2021.

* cited by examiner

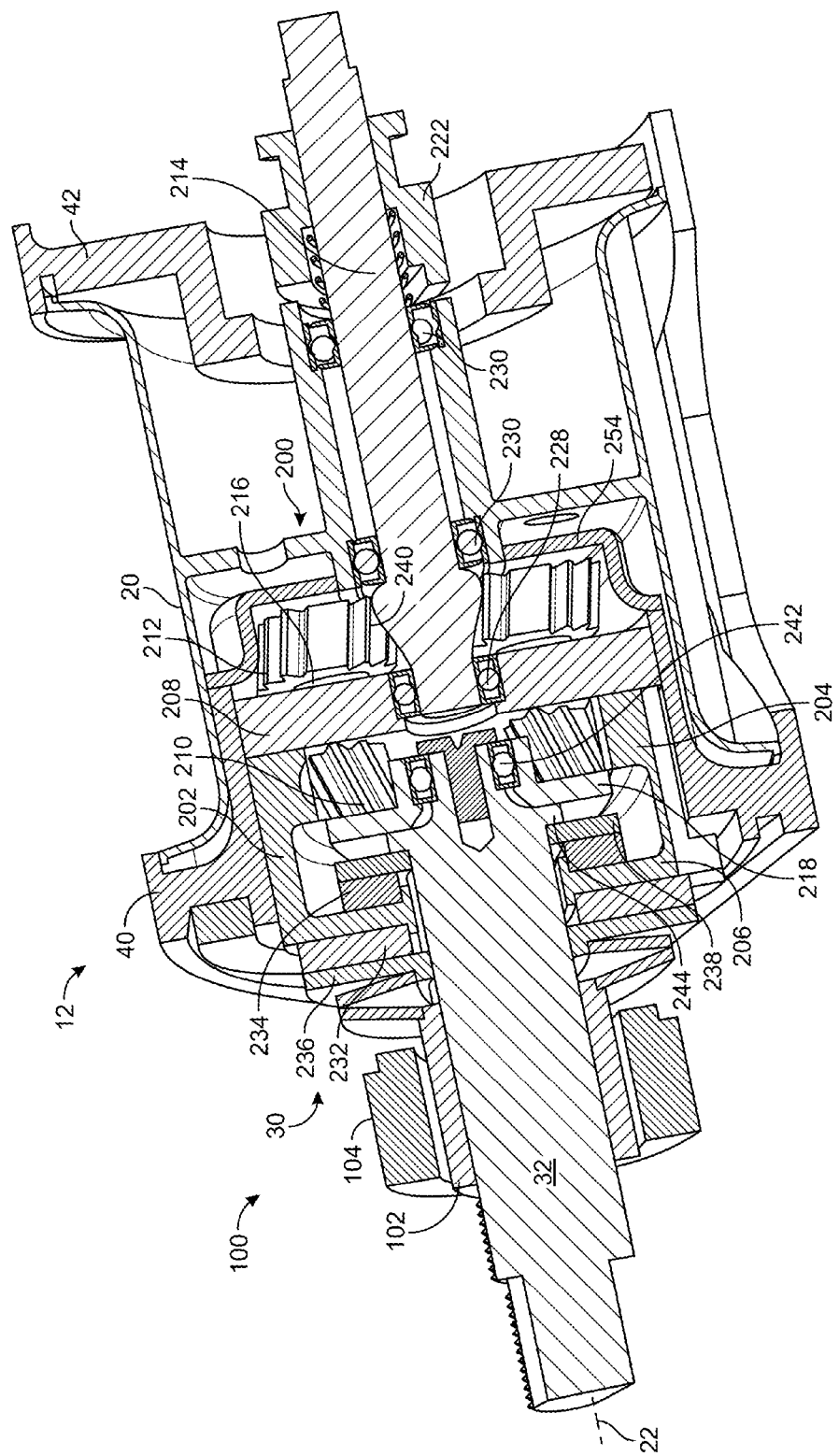

BAITCASTER WITH INTERNAL GEAR SET

CROSS-REFERENCE TO RELATED PATENT APPLICATION

This application is a continuation of U.S. application Ser. No. 17/072,902, filed Oct. 16, 2020, which claims the benefit of and priority to U.S. Provisional Application No. 62/916,458, filed Oct. 17, 2019, the entire disclosures of which are incorporated by reference herein.

BACKGROUND

The present disclosure relates generally to fishing reels. More particularly, the present disclosure relates to baitcasting fishing reels.

SUMMARY

At least one embodiment of the present disclosure relates to a baitcaster for retrieving a fishing line. The baitcaster includes a housing, a spool, and a compound gear set. The spool is positioned at least partially within the housing, defining an inner volume, and includes a spindle. The compound gear set is positioned at least partially within the inner volume of the spool. The compound gear set is configured to receive input mechanical energy from a first shaft and transfer output mechanical energy through a second shaft to drive the spool and thereby retrieve the fishing line. The spindle is positioned centrally within the inner volume of the spool. The spindle is fixedly coupled with the spool through a central member. The central member extends radially outwards from the spindle and divides the inner volume into a first inner volume and a second inner volume. The spool also includes a straight portion, a first curved portion positioned at a first end of the straight portion, and a second curved portion positioned at a second end of the straight portion. A transition between the straight portion and the first curved portion divides the first inner volume into a first sub-volume and a second sub-volume. The compound gear set also includes a ring gear, input planet gears, output planet gears, and a carrier configured to support the input planet gears and the output planet gears.

Another embodiment of the present disclosure relates to a fishing rod. The fishing rod includes a rod and a baitcaster. The baitcaster is fixedly coupled with the rod and is configured to retrieve a fishing line that extends along the rod. The baitcaster includes a housing, a spool, and a compound gear set. The spool is positioned at least partially within the housing, defines an inner volume, and includes a spool shaft. The compound gear set is positioned at least partially within the inner volume of the spool. The compound gear set is configured to receive input mechanical energy from an input shaft and transfer output mechanical energy to the spool through an output shaft and the spool shaft to drive the spool to retrieve the fishing line. The spool shaft is positioned centrally within the inner volume of the spool. The spool shaft fixedly couples with the spool through a central member. The central member extends radially outwards from the spool shaft and divides the inner volume into a first inner volume and a second inner volume. The spool includes a straight portion, a first curved portion positioned at a first end of the straight portion, and a second curved portion positioned at a second end of the straight portion. A transition between the straight portion and the first curved portion divides the first inner volume into a first sub-volume and a second sub-volume. The compound gear set includes a ring gear, input planet gears, output planet gears, a carrier configured to support the input planet gears and the output planet gears, and an output shaft Another embodiment of the present disclosure relates to a gear set for a baitcaster. The gear set includes a ring gear, input planet gears, output planet gears, a carrier, and an output shaft. The input planet gears are configured to engage with the ring gear. The output planet gears are rotatably coupled with the input planet gears. The carrier is configured to support the input planet gears and the output planet gears. The output shaft is configured to drive a spool of the baitcaster. The gear set is positioned at least partially within an inner volume of the spool of the baitcaster at a first end of the baitcaster and configured to receive an input torque through a handle at the first end of the baitcaster and drive the spool through a coupling between the output shaft and the spool at a second end of the baitcaster.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 5 is a sectional view of the spool drive mechanism of the baitcaster of FIG. 3, according to an exemplary embodiment.

DETAILED DESCRIPTION

Figure 1:
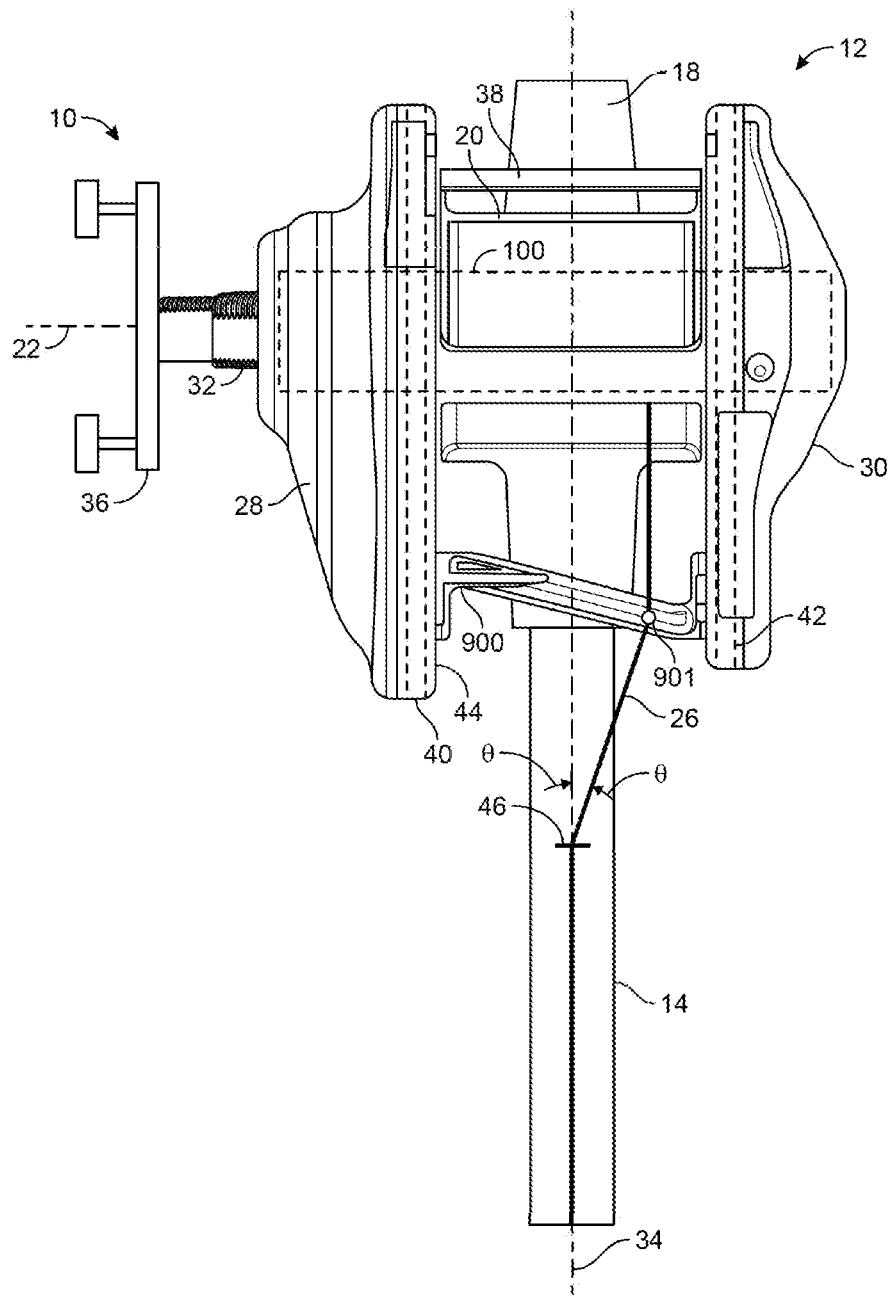
FIG. 1 is a top view of a baitcaster, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a fishing reel includes an elongated member or a fishing rod and a baitcaster apparatus. The baitcaster apparatus is fixedly coupled with the fishing rod and is configured to receive a torque input from a user to retrieve or take-up fishing line that extends along the fishing rod. The fishing line may extend through one or more eyelets that are positioned along the fishing rod and guide the fishing line towards the baitcaster apparatus for winding or take-up onto the spool.

The baitcaster apparatus may include body members and structural members. The body members may be spaced apart and cooperatively define an inner volume in which a spool drive mechanism is disposed. The spool drive mechanism can include a compound gear set. The compound gear set includes an input shaft that is configured to receive an input torque from the user through a handle. The input shaft may be fixedly rotatably coupled with a ring gear that includes radially inwards facing teeth. The radially inwards facing teeth are configured to engage multiple input planetary gears. The input planetary gears can each be fixedly coupled with planetary gear shafts that fixedly couple with output planetary gears. The input planetary gears, the planetary gear shafts, and the output planetary gears may be integrally formed with each other and can be supported by a carrier. The carrier may be rotatably fixedly coupled with a body or housing member of the baitcaster apparatus. The input planetary gears, the planetary gear shafts, and the output planetary gears may spin without orbiting about the input shaft.

The output planetary gears are configured to engage and drive an output shaft that extends along a same axis as the input shaft. The output shaft can be rotatably fixedly coupled with the spool to drive the spool to take up or let out the fishing line.

The spool drive mechanism can include a one-way bearing that is rotatably fixedly coupled with the input shaft. The one-way bearing may facilitate or allow rotation of the input shaft in a first direction (e.g., a take-up direction) but prevent rotation of the input shaft in a second, opposite, direction (e.g., a let-out direction). In some embodiments, the spool is selectively rotatably coupled with the input shaft so that the spool can be driven by the input shaft for winding the fishing line and free to rotate for letting out the fishing line.

The spool may define an inner volume that is divided into a first inner volume and a second inner volume. The first inner volume can be portions within the spool that are on a handle side of a central structural member of the spool. The second inner volume can be portions within the spool that are on an opposite side of the central structural member of the spool. The spool may include a straight portion that is substantially cylindrical. The spool may include curved or arcuate end portions that facilitate preventing fishing line from falling off opposite ends of the spool. The spool can include a central spool shaft that includes an inner volume through which the output shaft extends. The output shaft may rotatably couple with the spool shaft through one or more ball bearings that are positioned within the spool shaft. The input planetary gears may be at least partially positioned within the first inner volume of the spool. The carrier, planet gear shafts, and output planet gears are completely positioned within the first inner volume of the spool. Positioning the compound gear set within the spool (e.g., within the first inner volume of the spool) facilitates a more compact and robust spool drive mechanism and baitcaster apparatus.

Baitcaster

Figure 2:
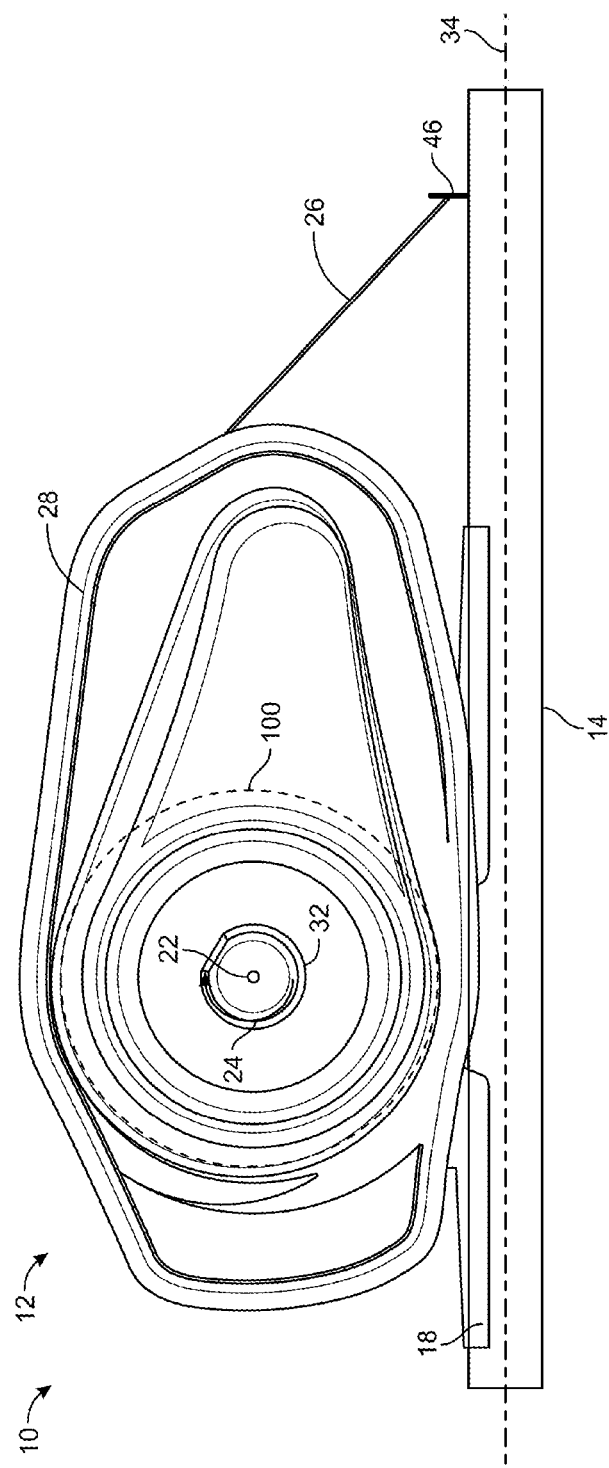
FIG. 2 is a side view of the baitcaster of FIG. 1, according to an exemplary embodiment.
Figure 3:
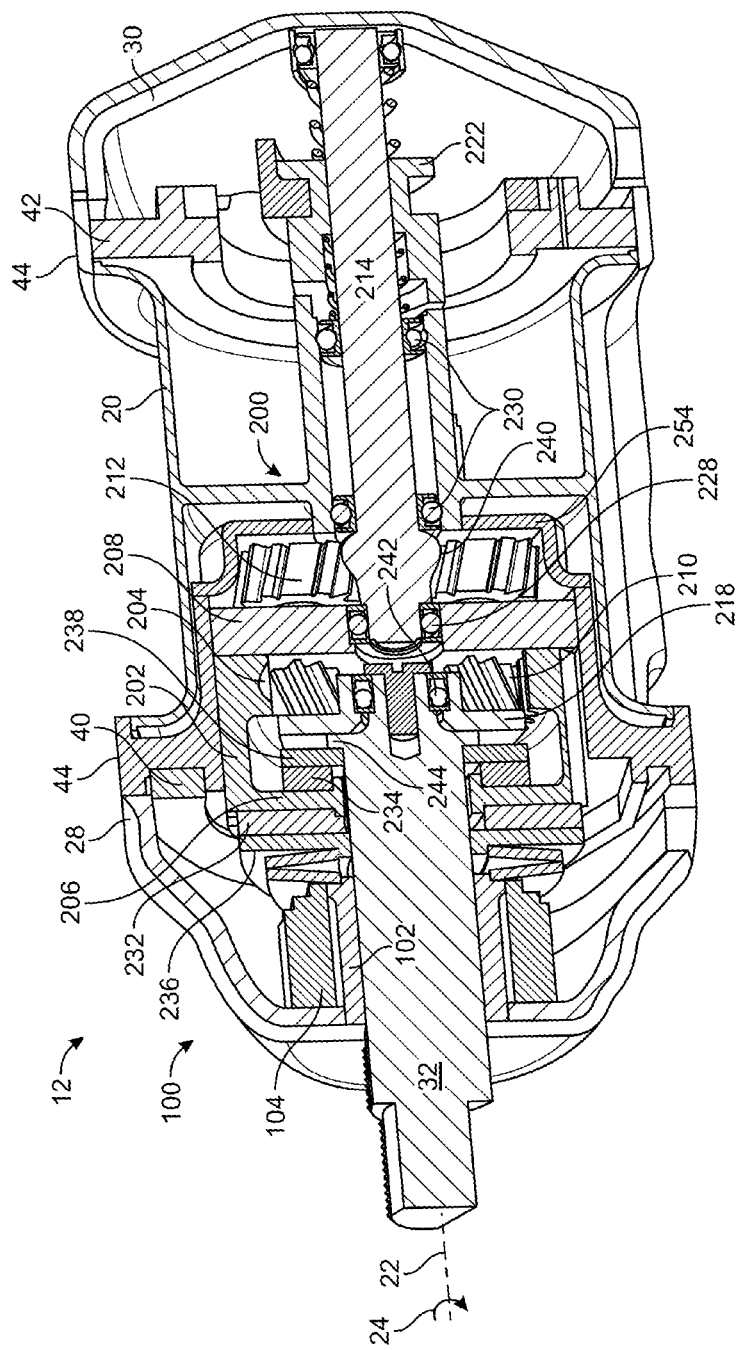
FIG. 3 is a sectional view of the baitcaster of FIG. 1 including a spool drive mechanism, according to an exemplary embodiment.

Referring particularly to FIGS. 1-3, a fishing reel, a baitcasting reel, a baitcaster, etc., shown as fishing reel 10 includes a rod, a pole, an elongated member, a flexible member, etc., shown as rod 14 and a reel apparatus, a reel mechanism, a reel assembly, a fishing line retrieval apparatus, etc., shown as reel 12. Reel 12 is fixedly coupled, attached, mounted, etc., with rod 14. In some embodiments, reel 12 is fixedly coupled with rod 14 through mounts, attachment members, etc., shown as mount 18. Mount 18 may extend from a bottom portion of reel 12 and fixedly couple with rod 14.

Reel 12 includes a spool, a barrel, a cylindrical member, etc., shown as spool 20. Spool 20 may be rotatably coupled with an input shaft, a rotatable shaft, a shaft, a first shaft, etc., shown as input shaft 32 such that spool 20 rotates when input shaft 32 is turned. In some embodiments, input shaft 32 is rotatably or fixedly coupled with a handle 36. An axis 22 extends through input shaft 32 and spool 20. Input shaft 32 and spool 20 can be co-axial with each other about axis 22. Handle 36 facilitates an input torque to input shaft 32 about axis 22 for driving spool 20. In some embodiments, handle 36 and input shaft 32 are configured to rotate in a first direction (e.g., direction 24) to take-up fishing line 26 so that fishing line 26 is wound onto spool 20.

Fishing line 26 can extend along rod 14 and may be guided by one or more eyelets 46. Eyelets 46 can be positioned along rod 14 and can include an opening, a hole, an aperture, etc., through which fishing line 26 passes. Fishing line 26 may extend from an eyelet 46 that is most proximate reel 12 onto spool 20. Rod 14 defines a central axis 34 that extends longitudinally through a center of rod 14. Fishing line 26 may be guided from eyelet 46 that is most proximate reel 12 to spool 20. Fishing line 26 that is between the eyelet 46 most proximate reel 12 and central axis 34 may define an angle θ. The angle θ may change from a maximum positive value $\theta_{+,max}$ to a maximum negative value $\theta_{-,max}$ as fishing line 26 is taken up or reeled onto spool 20.

Reel 12 includes a first or a handle-side body member, housing member, structural member, etc., shown as first body member 28, and a second body member, housing member, structural member, etc., shown as second body member 30. First body member 28 and second body member 30 can define opposite sides of reel 12. Spool 20 can be positioned between first body member 28 and second body member 30 and may extend between first body member 28 and second body member 30. Spool 20 can be supported or rotatably coupled on either end with first body member 28 and second body member 30. Spool 20 may rotate relative to first body member 28 and second body member 30.

Reel 12 includes a guide member 900 that is configured to extend between first body member 28 and second body member 30 and be driven to rotate by rotation of handle 36. In some embodiments, guide member 900 is configured to engage fishing line 26 at a contact point 901. Fishing line 26 may be guided onto spool 20 from contact point 901. For example, fishing line 26 may extend from contact point 901 onto spool 20 where it is then wound onto spool 20. Rotation of guide member 900 can result in reciprocative translation of contact point 901. For example, as guide member 900 rotates, contact point 901 may shift back and forth along guide member 900 between opposite ends of guide member 900. In this way, fishing line 26 is guided and wound onto spool 20 along an entire longitudinal length of spool 20, thereby facilitating an even distribution of fishing line 26 on spool 20 and reducing knotting and/or bunching of fishing line 26 on spool 20 (e.g., an uneven distribution of fishing line 26). Evenly distributing and winding fishing line 26 on spool 20 can reduce a likelihood of fishing line 26 snagging, knotting, or becoming tangled when fishing line 26 is let out (e.g., released) from spool 20 (e.g., for casting operations).

Referring still to FIGS. 1-2, input shaft 32 extends through first body member 28 and protrudes outwards from first body member 28. Handle 36 is coupled with input shaft 32 exterior of first body member 28 so that handle 36 can be operated by a fisherman's right hand while rod 14 is held by the fisherman's left hand. In other embodiments, input shaft 32 extends outwards through second body member 30 so that handle 36 is operated by the fisherman's left hand while rod 14 is held by the fisherman's right hand.

Input shaft 32 is configured to turn and drive rotation of spool 20 through a spool drive mechanism, a compound planetary gear assembly, a gear train, a gear assembly, etc., shown as spool drive mechanism 100. Spool drive mechanism 100 can be configured to receive torque from input shaft 32 and transfer the torque to spool 20 so that spool 20 rotates to take up or wind fishing line 26 onto spool 20.

Referring particularly to FIG. 1, reel 12 includes an input member, a bar, a rotatable linkage, a translatable member, a lever, a button, etc., shown as lever 38. Lever 38 may extend between first body member 28 and second body member 30 and may be pivotable, rotatable, and/or translatable between a first position and a second position. In some embodiments, lever 38 is configured to be transitioned between the first position and the second position to selectively couple input shaft 32 with spool 20.

Referring still to FIG. 1, reel 12 can include a first structural member, a first frame member, etc., shown as first frame member 40, and a second structural member, a second frame member, etc., shown as second frame member 42. First frame member 40 and second frame member 42 can be parallel with each other and may both extend in a longitudinal direction that is defined by central axis 34. First frame member 40 and second frame member 42 may be positioned within first body member 28 and second body member 30, respectively or may be positioned within an inner volume that is at least partially defined by first body member 28 and second body member 30.

Referring still to FIG. 1, reel 12 can include a central body member, a central housing, etc., shown as body member 44. In some embodiments, body member 44 extends between first body member 28 and second body member 30. First body member 28 and body member 44 may cooperatively define a first inner volume in which first structural member 40 is positioned. Second body member 30 and body member 44 may cooperatively define a second inner volume in which second structural member 42 is positioned.

Spool Drive Mechanism
Compound Planetary Gear Set

Referring particularly to FIGS. 3-13, spool drive mechanism 100 includes a planetary gear set, a planetary gear train, a compound planetary gear set, etc., shown as compound gear set 200. Compound gear set 200 may include input gear shaft 32 or may be driven by input shaft 32. For example, turning input shaft 32 may drive compound gear set 200 of spool drive mechanism 100, thereby driving rotation of spool 20.

Reel 12 also includes a second structural member, a left structural member, a frame member, etc., shown as second structural member 42. First structural member 40 and second structural member 42 can be parallel with each other and may be positioned apart. Input shaft 32 may extend through first structural member 40. In some embodiments, first body member 28 and second body member 30 are fixedly coupled with first structural member 40 and second structural member 42.

Referring still to FIGS. 1 and 8-11, compound gear set 200 includes a ring member 202 (e.g., a ring gear) that is configured to be driven to rotate by turning of input shaft 32. Ring member 202 can be centered or co-axial with axis 22 can may be configured to rotate about axis 22. Ring member 202 can include a ring gear portion 204 and an engagement portion 206. In some embodiments, ring gear portion 204 includes radially inwards facing teeth that are configured to engage or mesh with corresponding teeth, gears, planet gears, etc., of compound gear set 200. Engagement portion 206 can be selectably or adjustably fixedly coupled with input shaft 32. For example, engagement portion 206 may be fixedly rotatably coupled with input shaft 32 through a frictional interface. The frictional interface may be adjustable (e.g., by a user input, by twisting a knob, etc.) to increase or decrease a strength of the frictional interface.

Compound gear set 200 also includes a carrier 208, multiple planet gear shafts 216, input planet gears 210, output planet gears 212, and an output shaft 214. In some embodiments, ring member 202 includes radially inwards facing teeth that are configured to engage input planet gears 210. Input planet gears 210 are each rotatably or fixedly coupled with a corresponding one of planet gear shafts 216. Planet gear shafts 216 may each extend through and rotatably couple with an inner race of a corresponding planet gear bearing 224. An outer race of planet gear bearings 224 is fixedly coupled with carrier 208. For example, planet gear bearings 224 may be press fit into an aperture, an opening, a hole, a bore, etc., of carrier 208, shown as aperture 226. Carrier 208 can include multiple apertures 226 that are positioned a radial distance away from axis 22 and are evenly angularly spaced about axis 22. For example, compound gear set 200 can include three sets of a planet gear bearing 224, an input planet gear 210, an output planet gear 212, and a planet gear shaft 216. Output planet gears 212 may be positioned within an inner housing member, an inner shell member, an inner body member, etc., shown as inner body member 254. Inner body member 254 can extend between opposite portions of body member 44.

Planet gear bearings 224 are press fit, slip fit, or otherwise fixedly coupled along an outer race with apertures 226 (or an inner surface of carrier 208 that is defined by apertures 226). Planet gear shafts 216, input planet gears 210, and output planet gears 212 can be rotatably coupled with carrier 208 through planet gear bearings 224 so that planet gear shafts 216, input planet gears 210, and output planet gears 212 can spin relative to carrier 208 about their respective axes 220 (shown in FIG. 6). Planet gear shaft 216, input planet gear 210, and output planet gear 212 may be fixedly or rotatably coupled with each other (e.g., integrally formed) so that each set of planet gear shaft 216, input planet gear 210, and output planet gear 212 spin in unison about its respective axis 220. Axis 220 extends through each planet gear shaft 216, input planet gear 210, and output planet gear 212 and may be radially offset from axis 22 of input shaft 32. Planet gear shaft 216 is supported or rotatably coupled at a first end by a flange member 218 of compound gear set 200.

Input shaft 32 includes a first or proximate end where handle 36 is coupled with input shaft 32, and a second or distal end that is opposite the first end. Flange member 218 is rotatably coupled with input shaft 32 at the second or distal end. Flange member 218 is co-axial with axis 22 and may be free to rotate relative to input shaft 32. Flange member 218 may be configured to rotatably couple with the second end of input shaft 32 through input shaft bearing 242. Input shaft bearing 242 can include an inner race and an outer race. The outer race of input shaft bearing 242 can be fixedly coupled with a corresponding radially inwards facing surface of flange member 218. The inner race of input shaft bearing 242 can be fixedly coupled with a corresponding radially outwards facing surface of input shaft 32 at the second end of input shaft 32.

Flange member 218 is configured to rotatably couple with an end of planet gear shafts 216. In some embodiments, an end portion of planet gear shafts 216 or a protrusion of input planet gears 210 extends through a corresponding aperture of flange member 218. In this way, planet gear shafts 216 and/or input planet gears 210 may rotatably couple with flange member 218. In some embodiments, planet gear shafts 216 and input planet gears 210 are free to rotate about their axis 220 relative to flange member 218.

Input shaft 32 is configured to drive ring member 202 which engages and drives input planet gears 210. Input shaft 32 may rotate about axis 22, thereby driving ring member 202 to rotate about axis 22. Rotation of ring member 202 about axis 22 drives each set of input planet gear 210, planet gear shaft 216, and output planet gear 212 to spin about their respective axes 58. Input planet gears 210, planet gear shafts 216, and output planet gears 212 may each be driven to spin about their respective axes 58 by the engagement between teeth of input planet gears 210 and radially inwards facing teeth of ring member 202. In some embodiments, input planet gears 210, planet gear shafts 216, and output planet gears 212 spin about their respective axes 220 without orbiting about axis 22. For example, axes 220 may be translationally fixed relative to carrier 208 so that each assembly of input planet gear 210, planet gear shaft 216, and output planet gear 212 spin about axis 220 while axis 220 remains stationary.

Carrier 208 can be fixedly coupled with first structural member 40, first body member 28, or any other stationary structural or housing component of reel 12. Spinning of planet gear shafts 216 and input planet gears 210 about their respective axes 220 drives rotation of output planet gears 212 which engage, mesh, or otherwise interface with teeth 240 of output shaft 214. In some embodiments, output planet gears 212 have a larger number of teeth with respect to input planet gears 210 such that rotation of input shaft 32 at a first speed results in rotation of output shaft 214 at a second speed that is higher than the first speed. Output shaft 214 can be rotatably coupled with carrier 208 through a central bearing 228. For example, a radially outwards facing surface of output shaft 214 may be fixedly coupled with a radially inwards facing surface of an inner race of central bearing 228. A radially outwards facing surface of an outer race of central bearing 228 can be fixedly coupled (e.g., press fit, interference fit, slip fit, etc.) with a radially inwards facing surface of carrier 208.

In this way, turning input shaft 32 (e.g., by rotating handle 36) drives rotation of output shaft 214. Output shaft 214 can be fixedly coupled with spool 20 such that rotation of output shaft 214 about axis 22 drives rotation of spool 20 about axis 22. In some embodiments, output shaft 214 is selectably fixedly coupled with spool 20. Spool 20 can include an inner volume 52 through which output shaft 214 extends. In some embodiments, spool 20 and output shaft 214 are rotatably coupled with each other through spool bearings 230. A radially outwards facing surface of an outer race of spool bearings 230 is fixedly coupled or otherwise coupled with a radially inwards facing surface of spool 20. A radially inwards facing surface of an inner race of spool bearings 230 is fixedly coupled (e.g., press fit, keyed, etc.) with a radially outwards facing surface of output shaft 214.

Spool 20 can include a central member, a cylindrical member, a central sleeve, a spindle, a shaft, etc., shown as spool shaft 250. Spool shaft 250 may be a hollow cylindrical member that is integrally formed with spool 20. Spool shaft 250 includes a radially inwards facing surface 252 and may extend longitudinally along axis 22. Surface 252 may engage, abut, interface with, fixedly couple with, etc., a radially outwards facing surface of the outer race of spool bearings 230.

Ring member 202 may be fixedly rotatably coupled with input shaft 32 through a first frictional member 232 and a second frictional member 234. First frictional member 232 and second frictional member 234 are configured to engage, abut, contact, etc., opposite sides of engagement portion 206 of ring member 202 to fixedly couple ring member 202 with input shaft 32. First frictional member 232 may abut, contact, engage, etc., a first annular member, a first engagement member, a connecting member, etc., shown as first engagement member 236. Second frictional member 234 may abut, contact, engage, etc., a second annular member, a second engagement member, a connecting member, etc., shown as second engagement member 238. First engagement member 236 and second engagement member 238 may be rotatably fixedly coupled with input shaft 32.

As input shaft 32 is turned (e.g., by the fisherman's hand), rotational kinetic energy is transferred from input shaft 32 to ring member 202 through the frictional engagement between frictional members 232 and 234 and engagement portion 206 of ring member 202. Ring member 202 then rotates with input shaft 32 and drives input planet gears 210 to spin. Input planet gears 210 spin about their respective axes 220, thereby driving planet gear shaft 216 to spin and driving output planet gear 212 to spin. Output planet gears 212 engage teeth 240 of output shaft 214 so that spinning of output planet gears 212 drives rotation of output shaft 214.

Referring particularly to FIGS. 3-6, input shaft 32 can include a step, a shoulder, an annular protrusion, etc., shown as annular protrusion 244. Annular protrusion 244 is configured to engage second engagement member 238.

Referring particularly to FIGS. 3-4B, 7-8, 9, and 12, spool drive mechanism 100 can include a collar, a sleeve, an annular member, etc., shown as collar 102. Spool drive mechanism 100 can also include a one-way bearing, a sprag clutch, a sprag bearing, a trapped bearing, etc., shown as one-way bearing 104. One-way bearing 104 may facilitate or allow rotation of input shaft 32 in direction 24 about axis 22 but prevent, restrict, or facilitate preventing rotation of input shaft 32 about axis 22 in a direction opposite direction 24.

One-way bearing 104 can be rotatably coupled with collar 102 so that one-way bearing 104 is supported by collar 102 on input shaft 32. Collar 102 may be rotatably fixedly coupled with input shaft 32 such that collar 102 rotates or turns with input shaft 32. In some embodiments, one-way bearing 104 is fixedly rotatably coupled with first body member 28 so that first body member 28 can provide reactionary force to input shaft 32 through one-way bearing 104 and collar 102 to prevent or facilitate preventing turning input shaft 32 in a direction opposite direction 24.

When input shaft 32 is turned in direction 24, input shaft 32 drives ring member 202 which spins input planet gears 210 about their respective axes 220. Input planet gears 210 drive planet gear shafts 216 and output planet gears 212 to spin about axes 220. Output planet gears 212 then drive output shaft 214 to rotate about axis 22. One-way bearing 104 may allow turning of input shaft 32 in direction 24. Turning input shaft 32 in direction 24 drives input planet gears 210, planet gear shafts 216, and output planet gears 212 to spin about their respective axes 220 in direction 246. Spinning of input planet gears 210, planet gear shafts 216, and output planet gears 212 about axes 220 in direction 246 drives rotation of output shaft 214 in direction 248 about axis 22. Spool 20 may be rotatably fixedly coupled with output shaft 214 so that spool 20 rotates in direction 248 about axis 22 in unison with rotation of output shaft 214. In some embodiments, spool 20 and output shaft 214 rotate in direction 248 so that fishing line 26 is taken up or wound onto spool 20.

Spool 20 and output shaft 214 may be prevented from rotating in a direction about axis 22 that is opposite direction 248. If spool 20 and output shaft 214 are driven to rotate in a direction that is opposite direction 248, torque may be transferred through spool 20, output shaft 214, output planet gears 212, planet gear shafts 216, input planet gears 210, ring member 202, and input shaft 32. One-way bearing 104 may prevent rotation of back-driving of spool 20 and output shaft 214. In some embodiments, spool 20 and output shaft 214 are selectably coupled such that spool 20 may be free to rotate relative to output shaft 214 (e.g., during let-out of fishing line 26), thereby de-coupling spool 20 from one-way bearing 104.

Figure 13:
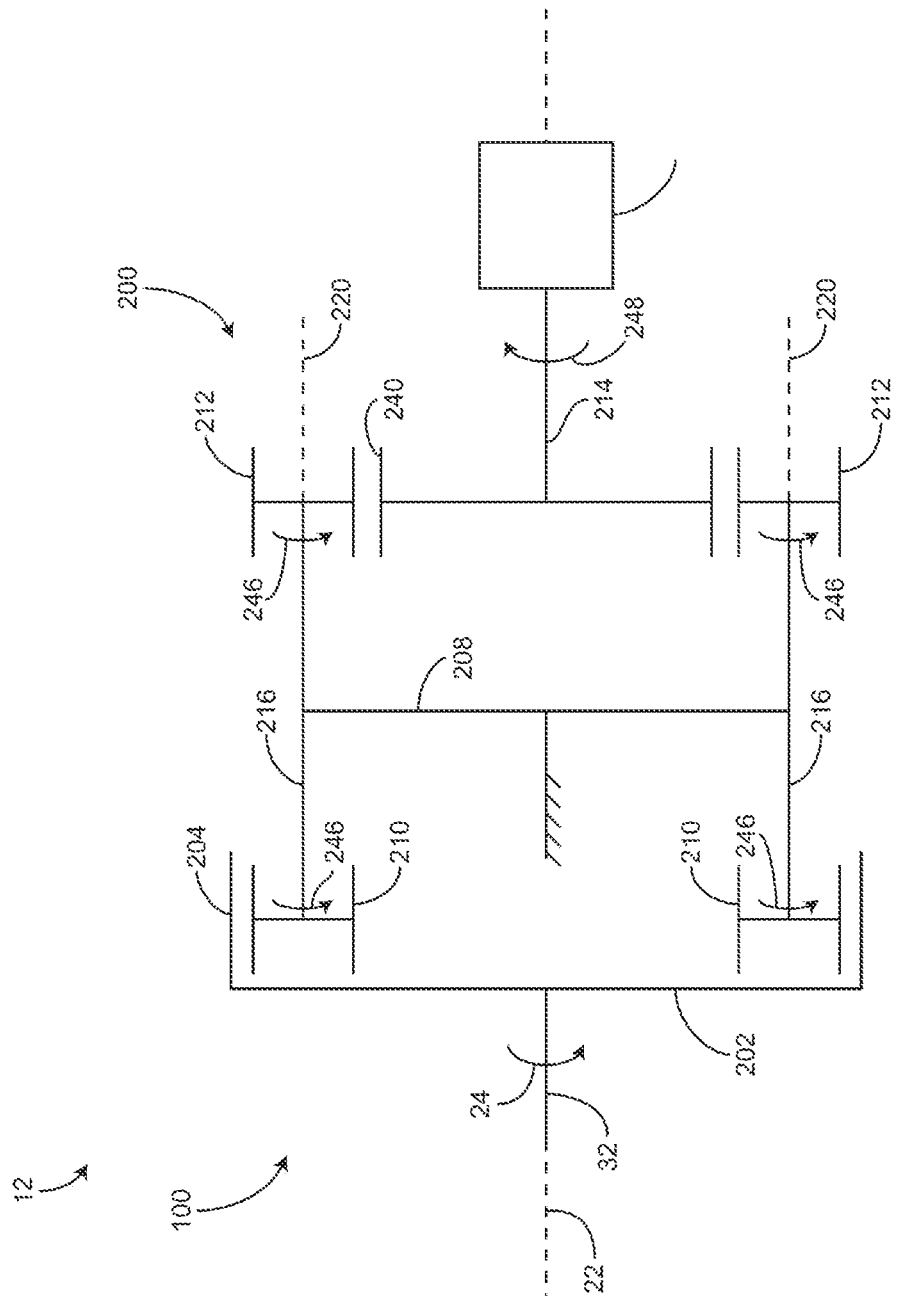
FIG. 13 is a schematic diagram of the compound gear set of FIG. 5, according to an exemplary embodiment.

Referring particularly to FIG. 13, a schematic diagram of compound gear set 200 is shown, according to an exemplary embodiment. Compound gear set 200 receives rotational kinetic energy from input shaft 32 (e.g., in direction 24) and transfers the rotational kinetic energy to input planet gears 210 such that input planet gears 210 spin about their respective axes 220 in direction 246. Compound gear set 200 may transfer the rotational kinetic energy from input shaft 32 to input planet gears 210 to spin input planet gears 210 about axes 220 in direction 246. Input planet gears 210 can rotate about axis 220 while being fixedly coupled with carrier 208. Carrier 208 is fixedly rotatably coupled such that axes 220 do not rotate relative to axis 22 (e.g., such that input planet gears 210, planet gear shafts 216, and output planet gears 212 do not orbit axis 22). Input planet gears 210, planet gear shafts 216, and output planet gears 212 rotate or spin about axes 220 and drive output shaft 214 through the interface or engagement between output planet gears 212 and teeth 240 of output shaft 214. Output shaft 214 may be rotatably fixedly coupled with spool 20 so that spool 20 rotates about axis 22. Spool 20, output shaft 214, and input shaft 32 may all be co-axial with each other (e.g., about axis 22).

Internal Gearing

Figure 4A:
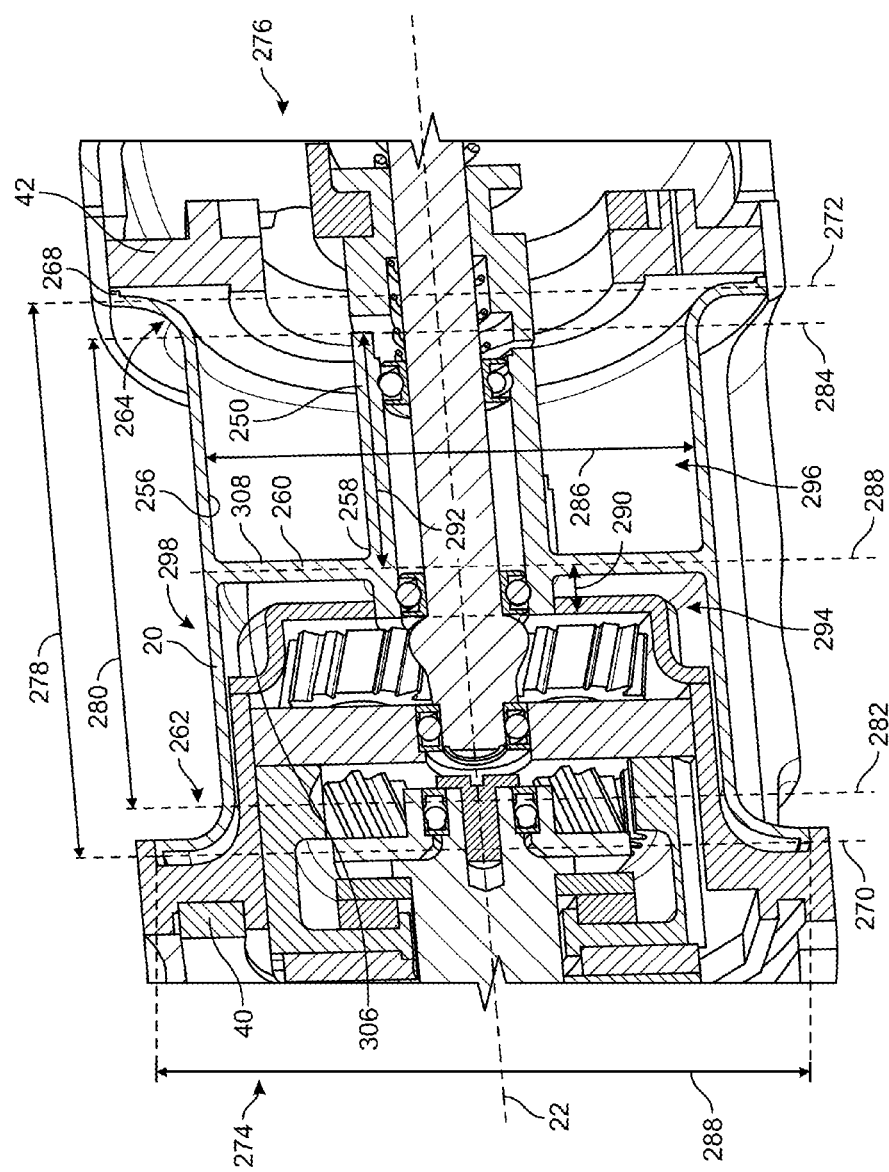
FIG. 4A is a perspective sectional view of the baitcaster of FIG. 3, including the spool drive mechanism positioned at least partially within an inner volume defined by a spool of the baitcaster, according to an exemplary embodiment.
Figure 4B:
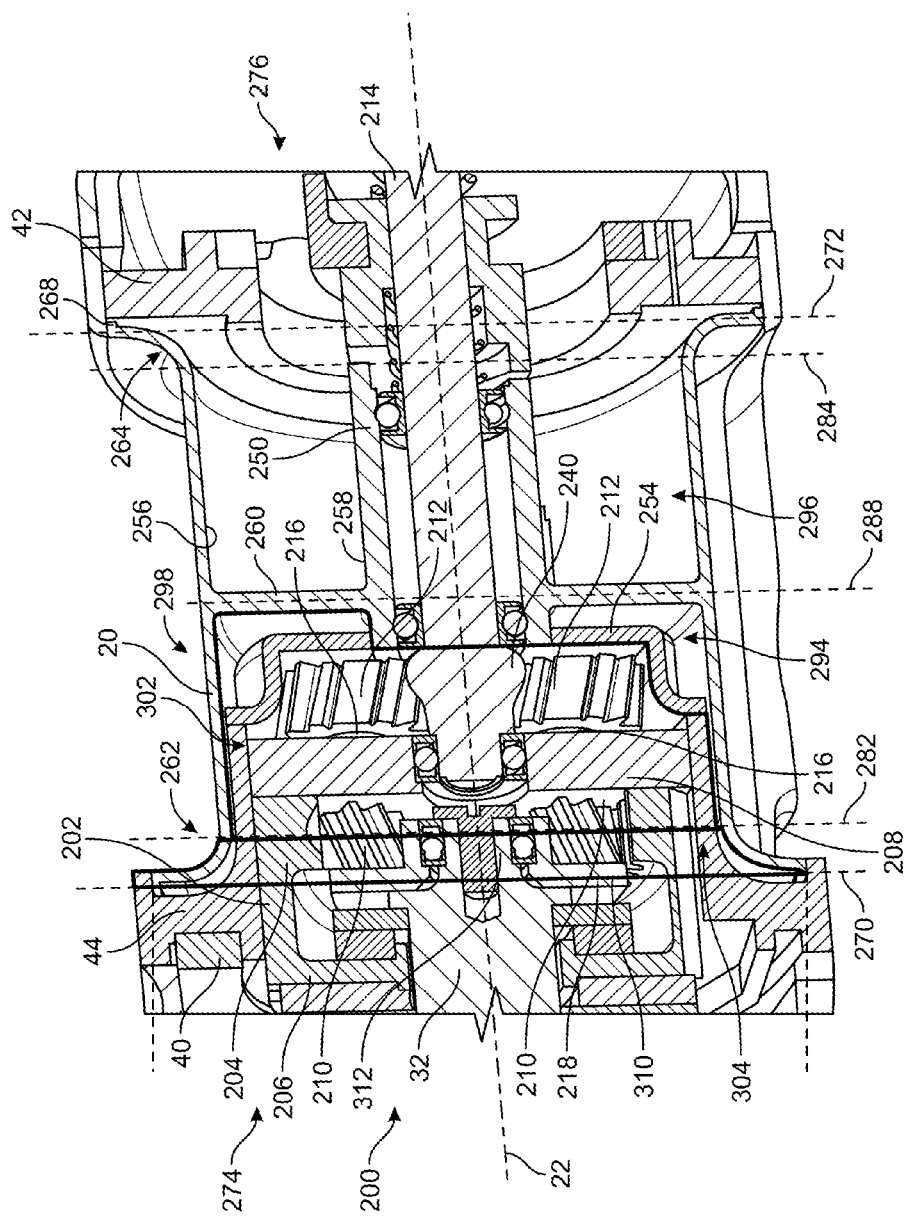
FIG. 4B is a perspective sectional view of the baitcaster of FIG. 3, including the spool drive mechanism positioned at least partially within an inner volume defined by a spool of the baitcaster, according to an exemplary embodiment.
Figure 6:
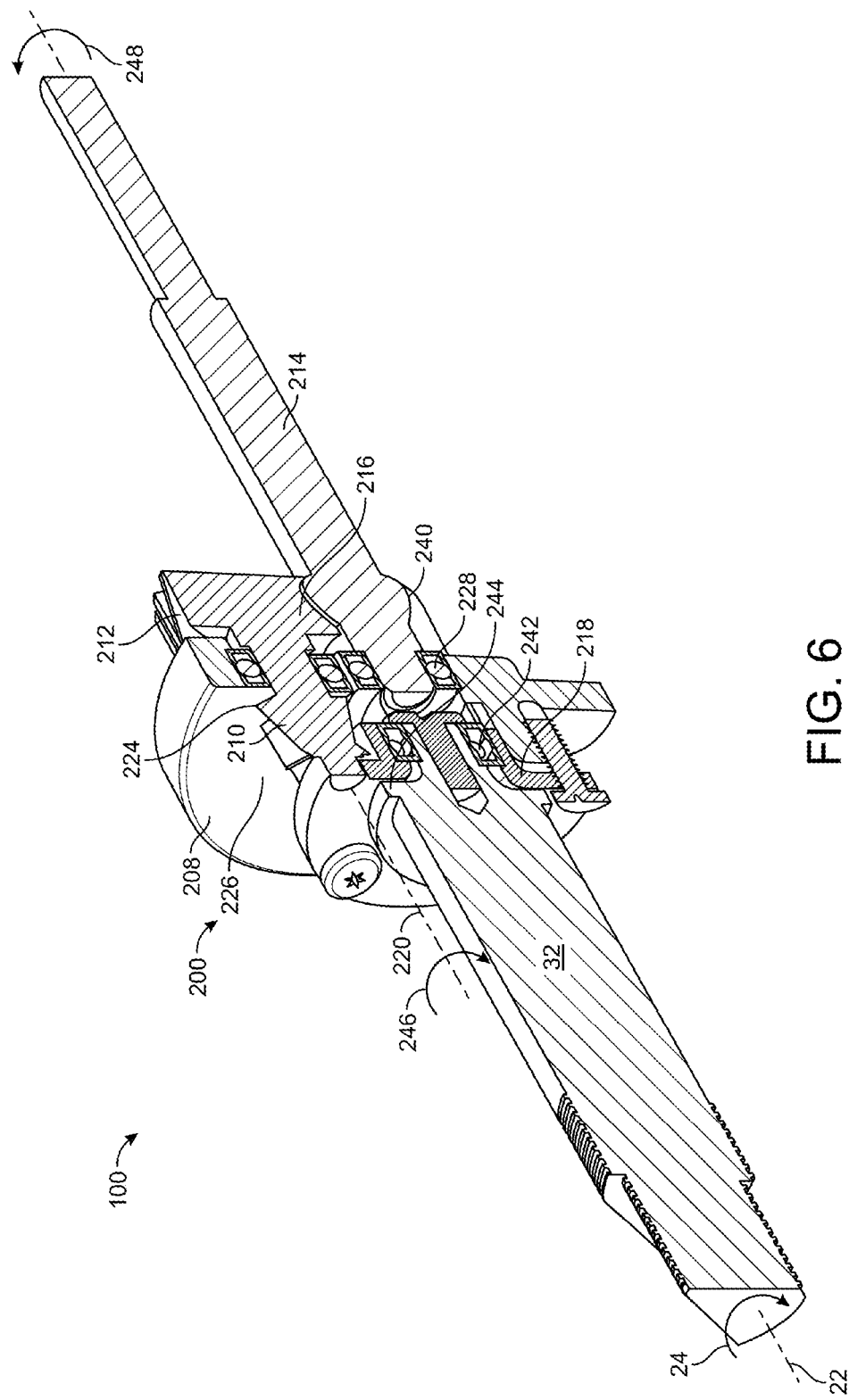
FIG. 6 is a perspective sectional view of a compound gear set that receives an input torque from a handle and outputs torque to a spool of the baitcaster of FIG. 1, according to an exemplary embodiment.
Figure 7:
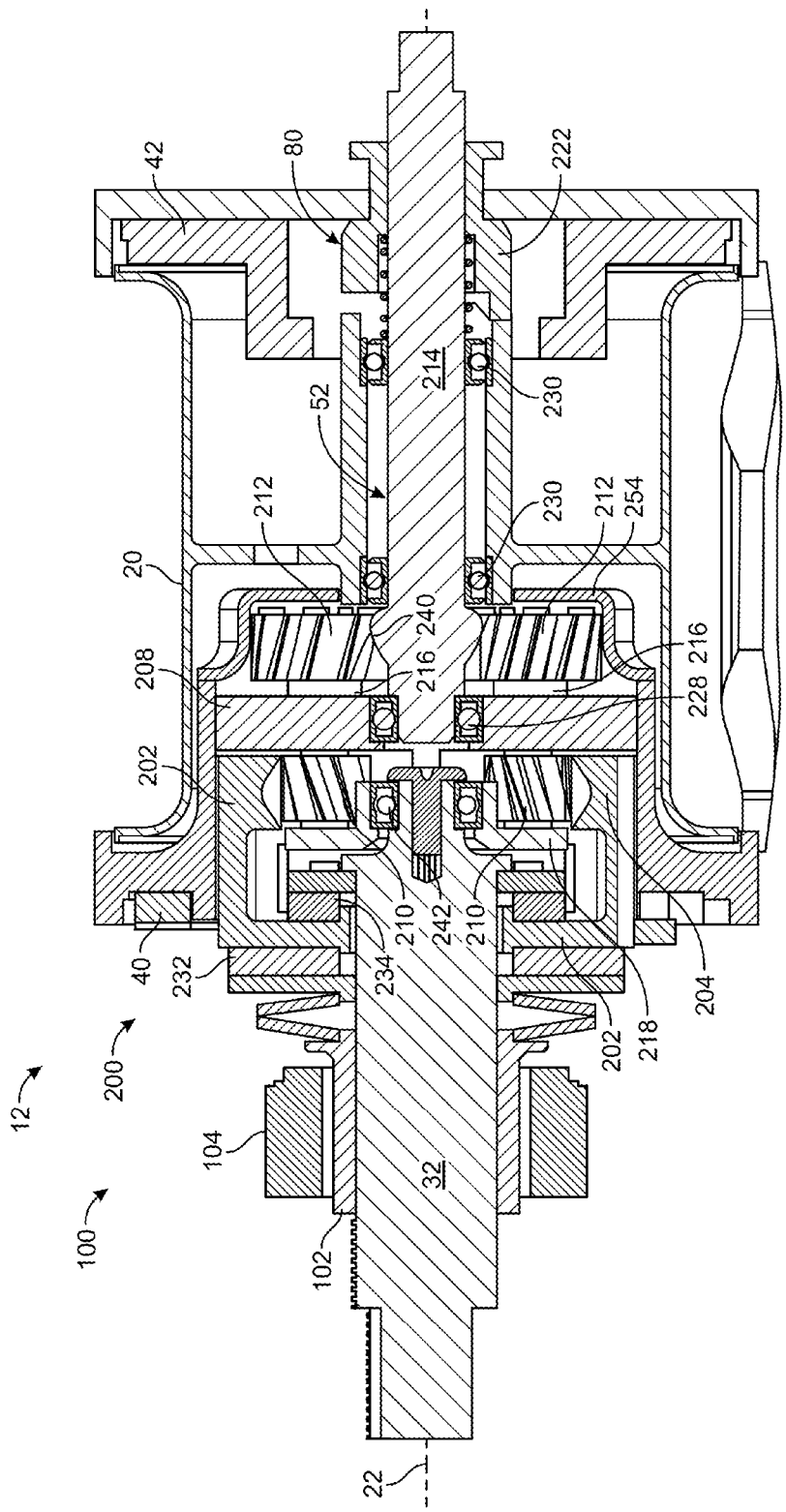
FIG. 7 is a sectional view of the baitcaster of FIG. 1, according to an exemplary embodiment.
Figure 8:
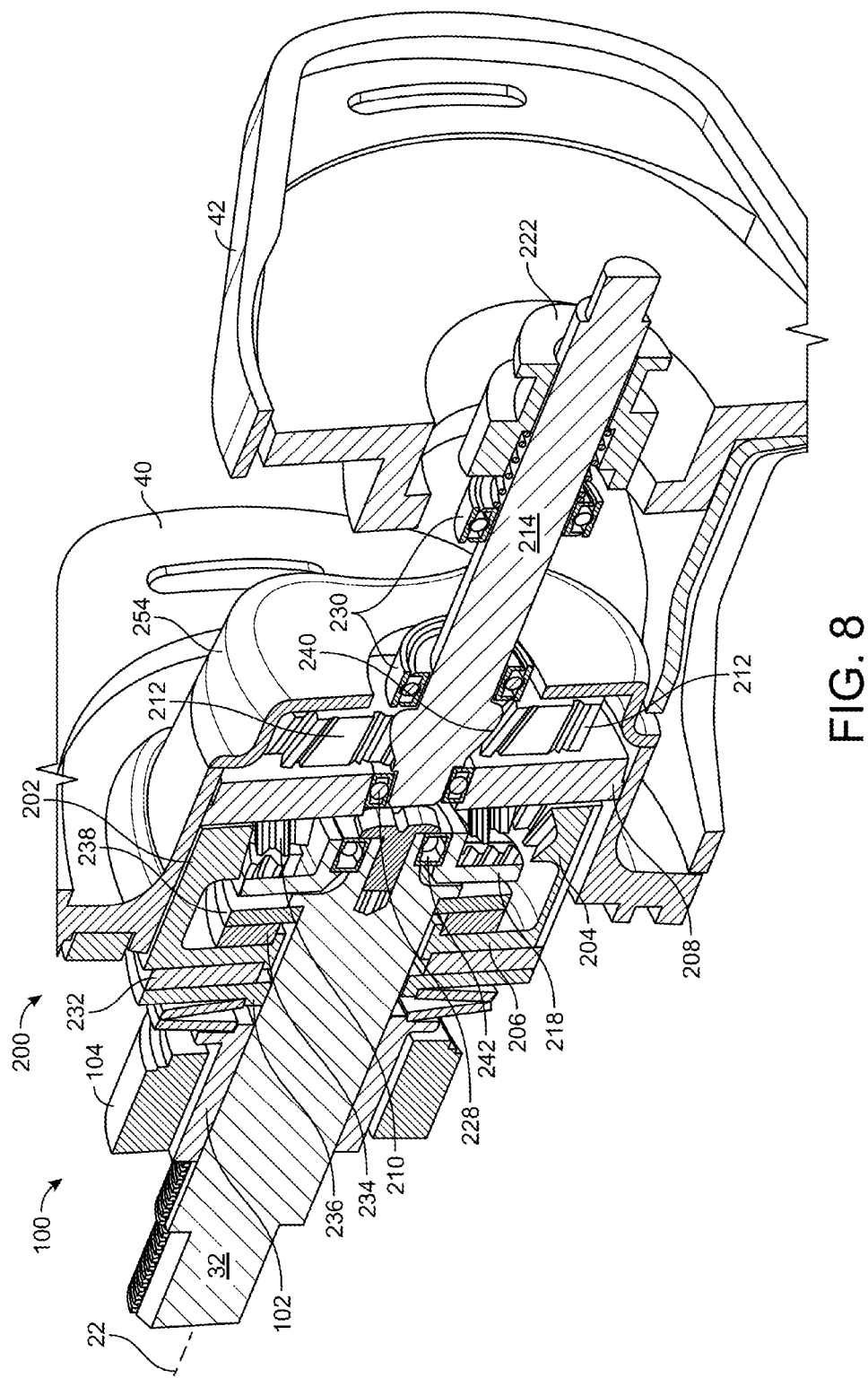
FIG. 8 is a perspective sectional view of the baitcaster of FIG. 1, according to an exemplary embodiment.
Figure 9:
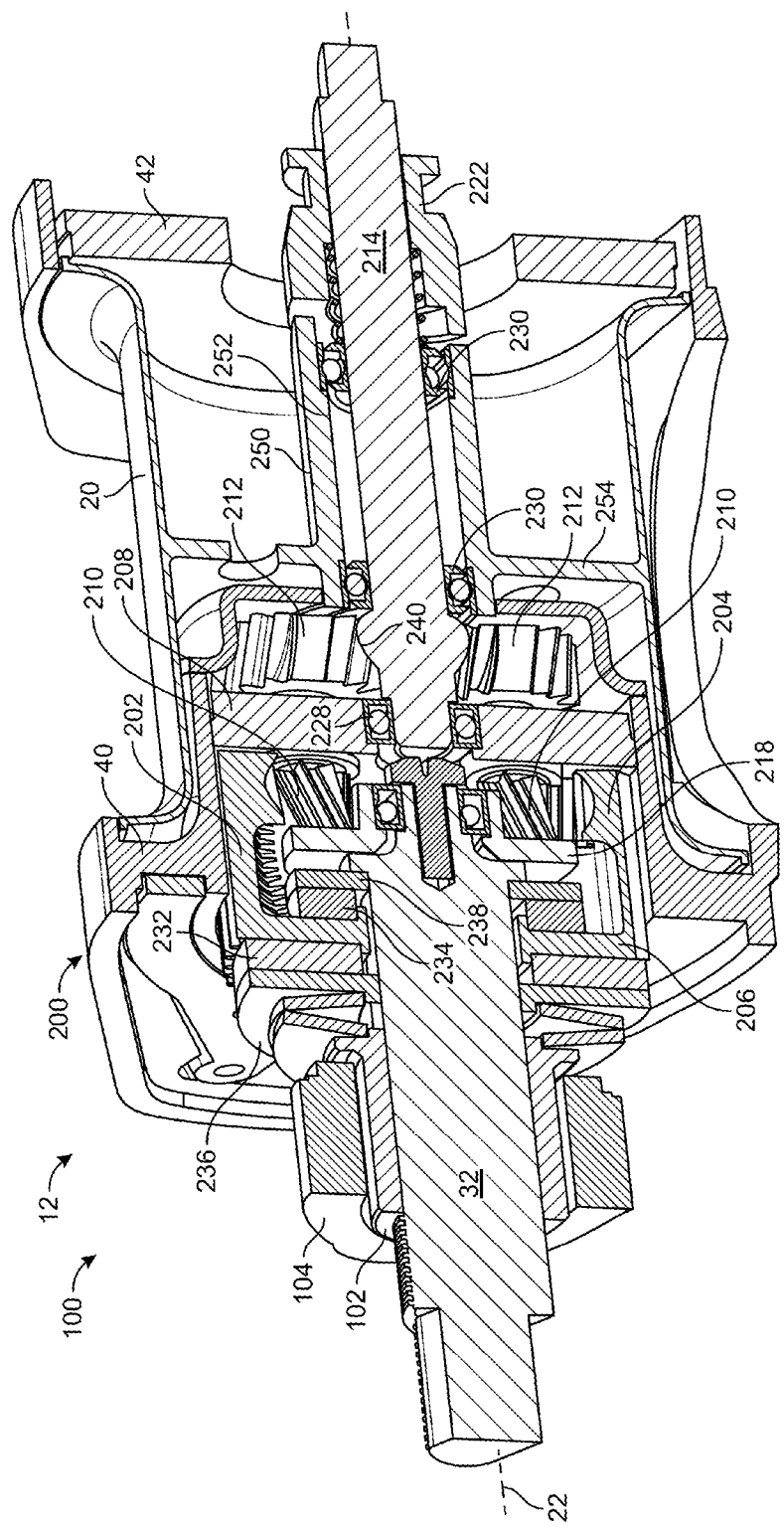
FIG. 9 is a perspective sectional view of the baitcaster of FIG. 1, according to an exemplary embodiment.
Figure 10:
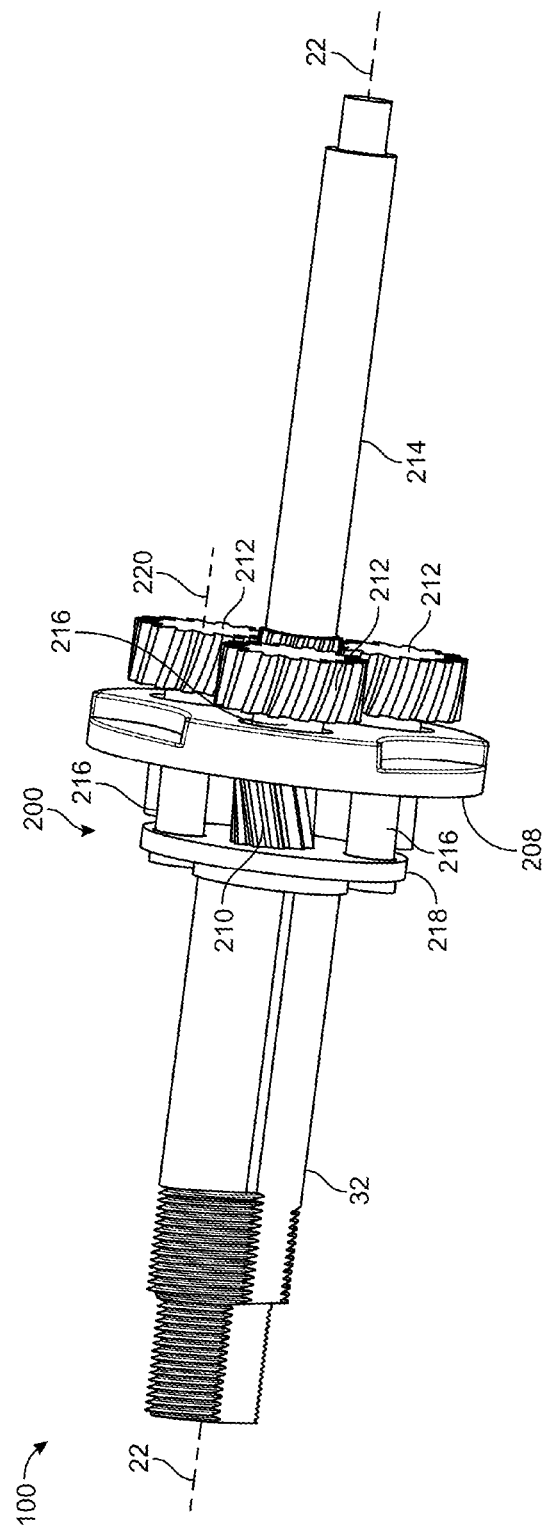
FIG. 10 is a perspective view of the compound gear set of FIG. 5, according to an exemplary embodiment.
Figure 11:
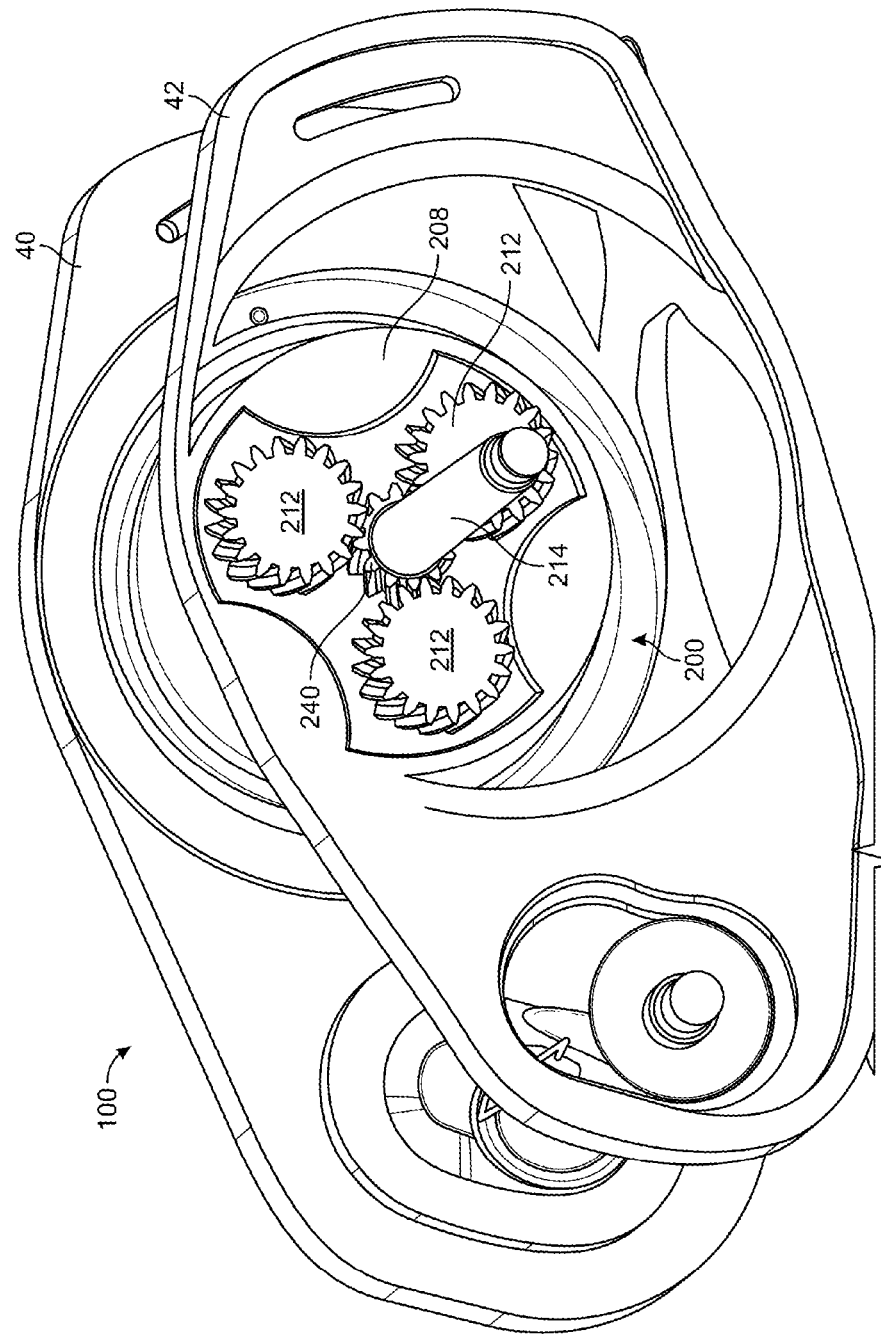
FIG. 11 is a perspective view of a portion of the baitcaster of FIG. 1, according to an exemplary embodiment.
Figure 12:
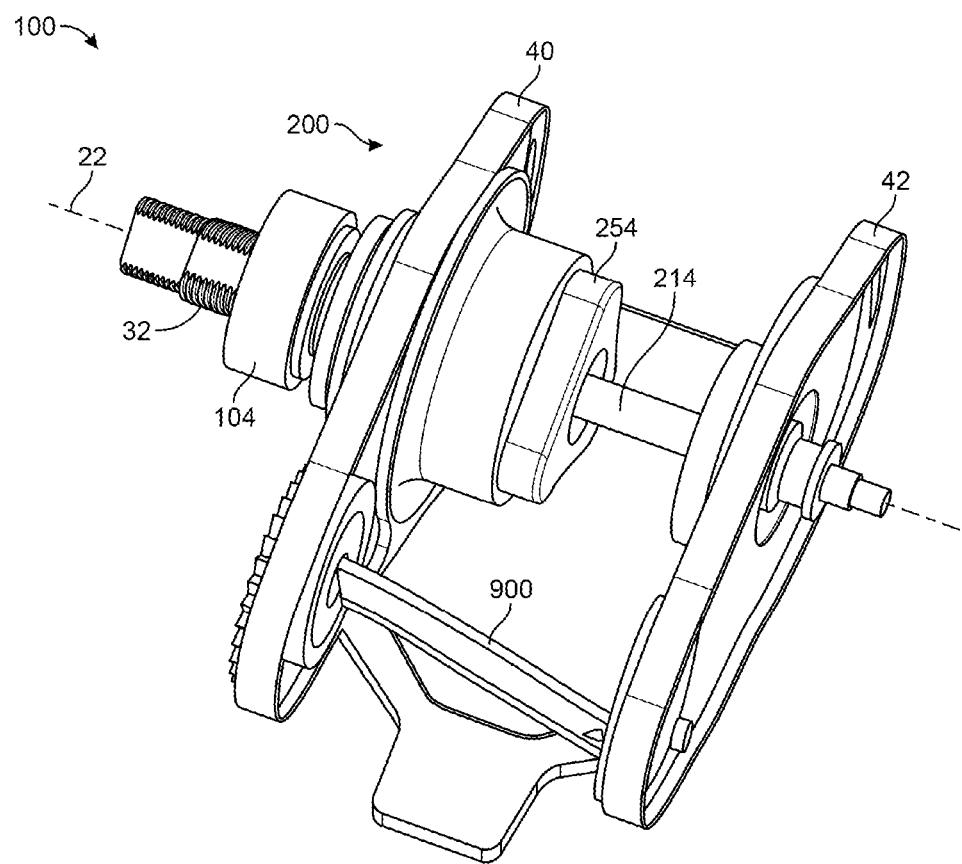
FIG. 12 is a perspective view of a portion of the baitcaster of FIG. 1, according to an exemplary embodiment.

Referring particularly to FIGS. 4A-4B, spool 20 is shown in greater detail, according to an exemplary embodiment. Spool 20 may have a generally cylindrical shape including a straight portion, a cylindrical portion, etc., shown as straight portion 298, and curved outer portions, arcuate outer portions, outer radii, etc., shown as first curved portion 262 and second curved portion 264. Spool 20 is positioned between first body member 28 and second body member 30. In particular, spool 20 is positioned between first frame member 40 and second frame member 42. Spool 20 may be centered about axis 22 and extends along a longitudinal direction defined by axis 22 between first frame member 40 and second frame member 42.

Spool 20 also includes a first end, a first side, a proximate end, a proximate side, etc., shown as handle end 274, and a second end, a second side, a distal end, a distal side, etc., shown as distal end 276. First curved portion 262 is at handle end 274 of spool 20, while second curved portion 264 is at distal end 276 of spool 20. In some embodiments, first curved portion 262 is a portion of spool 20 that is most proximate first frame member 40 or first body member 28. Likewise, second curved portion 264 is a portion of spool 20 that is most distal first frame member 40 or first body member 28, or is most proximate second body member 30 or second frame member 42.

Spool 20 may include an inner diameter, an inner distance, an inner radial distance, etc., shown as inner diameter 286. Inner diameter 286 extends radially relative to axis 22 between an inner surface 256 of spool 20. In some embodiments, inner surface 256 is a radially inwards facing surface of spool 20. For example, inner surface 256 may be a cylindrical and radially inwards facing surface of straight portion 298. Spool 20 also includes an outer diameter, an outer distance, an outer radius, etc., shown as outer diameter 288. Outer diameter 288 is defined by an outer periphery, an outer edge, an outer surface, etc., of spool 20. For example, outer diameter 288 may be defined as a distance that extends between a radially outermost surface, periphery, edge, etc., of spool 20. In some embodiments, the radially outermost surface, periphery, edge, etc., of spool 20 is defined by first curved portion 262 and second curved portion 264. For example, first curved portion 262 and second curved portion 264 may curve radially outwards from straight portion 298 of spool 20 to define outer diameter 288.

Spool 20 has an overall longitudinal length 278 that extends between longitudinally opposite peripheries, edges, surfaces, faces, ends, etc., of spool 20. In some embodiments, overall longitudinal length 278 is greater than a longitudinal length 280 of straight portion 298. Longitudinal length 280 of straight portion 298 may extend between points on spool 20 where first curved portion 262 and second curved portion 264 begin. For example, first curved portion 262 may begin at handle end 274 of straight portion 298 while second curved portion 264 may begin at distal end 276 of straight portion 298. A first axis 282 extends radially through axis 22 at a longitudinal position along spool 20 where first curved portion 262 begins (e.g., at a transition between straight portion 298 and first curved portion 262). A second axis 284 extends radially through axis 22 at a longitudinal position along spool 20 where second curved portion 264 begins (e.g., at a transition between straight portion 298 and second curved portion 264). In some embodiments, first axis 282 extends radially through axis 22 at handle end 274 of straight portion 298. In some embodiments, second axis 284 extends radially through axis 22 at distal end 276 of straight portion 298. In some embodiments, first axis 282 extends radially through axis 22 at a longitudinal position of an apex of first curved portion 262. In some embodiments, second axis extends radially through axis 22 at a longitudinal position of an apex of second curved portion 262.

Spool 20 also defines a first outer axis 270, and a second outer axis 272. First outer axis 270 and second outer axis 272 extend radially through axis 22 at longitudinally outer edges, peripheries, surfaces, etc., of spool 20. For example, first outer axis 270 may extend radially through axis 22 at a longitudinally handle-most position, periphery, edge, surface, etc., of spool 20. For example, first outer axis 270 may be defined as an axis that extends radially through axis 22 at handle end 274 of first curved portion 262. Likewise, second outer axis 272 may extend radially through axis 22 at a longitudinally distal position, periphery, edge, surface, etc., of spool 20. In some embodiments, second outer axis 272 extends radially through axis 22 at distal end 276 of second curved portion 264.

It should be understood that any of first axis 282, second axis 284, first outer axis 270, and second outer axis 272 may define a plane. Any of the planes defined by first axis 282, second axis 284, first outer axis 270, and second outer axis 272 may be perpendicular to axis 22.

Spool 20 also includes a radially extending central axis 288, according to some embodiments. In some embodiments, central axis 288 extends radially through axis 22 at a longitudinal center position of spool 20. For example, central axis 288 may be equidistant longitudinally from both first axis 282 and second axis 284. In some embodiments, central axis 288 is equidistant longitudinally from both first outer axis 270 and second outer axis 272.

Spool 20 includes a central member, a central frame member, a radially extending support member, a support member, etc., shown as central member 260. Central member 260 extends radially between inner surface 256 of straight portion 298 of spool 20 and a radially outwards facing surface 258 of spool shaft 250. In some embodiments, central member 260 is longitudinally positioned along spool 20 at a central position of spool 20. For example, central member 260 may extend along central axis 288. In other embodiments, central member 260 is longitudinally offset (e.g., towards handle end 274 or towards distal end 276) along spool 20. In some embodiments, central axis 288 is defined as an axis that extends radially through axis 22 through central member 260. Central member 260 provides structural support between outer portions of spool 20 (e.g., between straight portion 298, first curved portion 262, and second curved portion 264) and spool shaft 250.

Central member 260 includes a first surface 306, and a second surface 308. First surface 306 and second surface 308 are spaced longitudinally apart along axis 22. First surface 306 faces handle end 274 of spool 20, while second surface 308 faces distal end 276 of spool 20. Straight portion 298 may be defined or divided into two straight portions. For example, straight portion 298 may be divided into a first straight portion and a second straight portion by central member 260 and/or by central axis 288. The first portion of straight portion 298 is proximate handle end 274, first body member 28, and/or first frame member 40. The second portion of straight portion 298 is proximate distal end 276, second body member 30, and/or second frame member 42.

Spool shaft 250 may also be defined by or divided into two portions by central member 260 and/or central axis 288. For example, spool shaft 250 may be divided into a first or proximate portion that is proximate handle end 274 of spool 20 (e.g., on a handle-side of central member 260 and/or central axis 288) and a second or distal portion that is proximate distal end 276 of spool 20 (e.g., on an opposite side of central member 260). In some embodiments, the first portion of spool shaft 250 has a longitudinal length 290 that is defined between a longitudinally outer periphery, a longitudinally outer edge, a longitudinally outer surface, a longitudinally outer most portion, a handle end 274, etc., of spool shaft 250 or an end of spool shaft 250 that is most proximate handle 36, first body member 28, first frame member 40, etc., and first surface 306. In some embodiments, the second portion of spool shaft 250 has a longitudinal length 290 that is defined between a longitudinally outer periphery, a longitudinally outer edge, a longitudinally outer surface, a longitudinally outer most portion, a distal end 276, etc., of spool shaft 250 or an end of spool shaft 250 that is most proximate second body member 30, second frame member 42, etc.

In some embodiments (e.g., as shown in FIG. 4A), longitudinal length 292 of the second portion of spool shaft 250 is greater than longitudinal length 290. In other embodiments, longitudinal length 292 is less than longitudinal length 290. In still other embodiments, longitudinal length 292 and longitudinal length 290 are substantially equal to each other.

Referring particularly to FIGS. 4A and 4B, spool 20 defines a first inner volume, a first area, a first space, etc., shown as first inner volume 294, and a second inner volume, a second area, a second space, etc., shown as second inner volume 296. First inner volume 294 is an inner volume defined by spool 20 that is on handle end 274 of central member 260. Second inner volume 296 is an inner volume defined by spool 20 that is on distal end 276 of central member 260. First inner volume 294 can be defined as areas, spaces, or volumes within spool 20 and may be defined by a radial axis extending through handle end 274 of spool shaft 250, radially outwards surface 250 of the first portion of spool shaft 250, first surface 306, inner surface 256 of the first portion of straight portion 298 and first curved portion 262, and first outer axis 270 (or by a plane that is perpendicular with axis 22 and is defined by first outer axis 270). Second inner volume 296 may be defined as areas, spaces, or volumes within spool 20 defined by a radial axis extending through distal end 276 of spool shaft 250, radially outwards facing surface 258 of spool shaft 250, second surface 308, inner surface 256 of the second portion of straight portion 298 and second curved portion 264, and second outer axis 272.

In some embodiments, first inner volume 294 is further divided into a first sub-volume 302 and a second sub-volume 304. First sub-volume 302 may be portions of first inner volume 294 that lie between central axis 288 and first axis 282. Second sub-volume 304 may be portions of first inner volume 294 that lie between first outer axis 270 and first axis 282. For example, first sub-volume 302 can be any inner volumes or spaces of spool 20 that are between first surface 306 and first axis 282 (e.g., at the transition between straight portion 298 and first curved portion 262). Second sub-volume 304 can be any spaces, inner volumes, voids, etc., within spool 20 that are between first axis 282 and first outer axis 270 (e.g., within spool 20 along first curved portion 262).

Referring particularly to FIG. 4B, compound gear set 200 is positioned within first inner volume 294 of spool 20. In some embodiments, compound gear set 200 is positioned partially within first inner volume 294 of spool 20. In other embodiments, compound gear set 200 is positioned completely within first inner volume 294 of spool 20. Compound gear set 200 can include various components that are positioned completely within first sub-volume 302, other components that are positioned completely within second sub-volume 304, and/or other components that are positioned at a transition between first sub-volume 302 and second sub-volume 304.

Referring still to FIG. 4B, carrier 208 can be positioned within first sub-volume 302. In some embodiments, carrier 208 is completely positioned within first sub-volume 302. For example, carrier 208 can be positioned between first axis 282 and central axis 288. Carrier 208 can be positioned at a longitudinal position along the first portion of straight portion 298 of spool 20. In some embodiments, carrier 208 is positioned at a longitudinal centerpoint of first sub-volume 302. In other embodiments, carrier 208 is offset from the longitudinal centerpoint of first sub-volume 302 (e.g., is closer to handle end 274 of first sub-volume 302 or is closer to distal end 276 of first sub-volume 302). In some embodiments, carrier 208 is positioned at a longitudinal centerpoint of first inner volume 294.

Referring still to FIG. 4B, planet gear shafts 216 extend through first sub-volume 302 and second sub-volume 304. In some embodiments, planet gear shafts 216 are completely positioned within first inner volume 294. For example, a first, proximate, or handle facing end of planet gear shafts 216 may terminate within second sub-volume 304, while a second, distal, or opposite end of planet gear shafts 216 may terminate within first sub-volume 302. In some embodiments, the first end of planet gear shafts 216 terminates, ends, or lies at the transition between first sub-volume 302 and second sub-volume 304. For example, the first end of planet gear shafts 216 may terminate substantially at first axis 282. In some embodiments, the first end of planet gear shafts 216 terminates or extends up to an outermost periphery, edge, border, etc., of second sub-volume 304 (e.g., at first outer axis 270). In still other embodiments, the first end of planet gear shafts 216 terminates at a position beyond the outermost border of second sub-volume 304 (e.g., at a longitudinal position that is beyond handle 36 or beyond first outer axis 270). Planet gear shafts 216 may extend across, intersect, etc., the transition between the first sub-volume 302 and the second sub-volume 304.

Referring still to FIG. 4B, input planetary gears 210 are positioned at the first ends of planet gear shafts 216. In some embodiments, input planetary gears 210 are press fit, keyed, etc., or otherwise rotatably fixedly coupled with planet gear shafts 216 at the first ends of planet gear shafts 216. In some embodiments, input planetary gears 210 are integrally formed with the first ends of planet gear shafts 216.

Input planetary gears 210 may be positioned within first inner volume 294. In some embodiments, input planetary gears 210 are positioned at the transition between first sub-volume 302 and second sub-volume 304. For example, input planetary gears 210 can be positioned longitudinally such that input planetary gears 210 intersect with or lie along first axis 282. In some embodiments, a portion of input planetary gears 210 is positioned within second sub-volume 304 while another portion of input planetary gears 210 is positioned within first sub-volume 302. In some embodiments, input planetary gears 210 are positioned longitudinally such that first axis 282 extends through a longitudinal centerpoint of input planetary gears 210. In other embodiments, input planetary gears 210 are positioned longitudinally such that first axis 282 extends through a portion of input planetary gears 210 that is offset from the longitudinal center of input planetary gears 210. For example, a portion of input planetary gears 210 that lies within first sub-volume 302 may have a longitudinal length that is substantially equal to, greater than, or less than, a longitudinal length of a portion of input planetary gears 210 that lies within second sub-volume 304. In other embodiments, planet gear shafts 216 have a longitudinal length such that input planetary gears 210 lie completely within first sub-volume 302. In other embodiments, planet gear shafts 216 have a longitudinal length such that input planetary gears 210 lie completely within second sub-volume 304.

Referring still to FIG. 4B, output shaft 214 may extend through both first inner volume 294 and second inner volume 296. In some embodiments, output shaft 214 extends into and terminates within first sub-volume 294. For example, teeth 240 can be positioned completely within first sub-volume 302.

Referring still to FIG. 4B, ring member 202 can extend partially into first inner volume 294. For example, ring gear portion 204 of ring member 202 may lie completely within first inner volume 294, while engagement portion 206 is outside of first inner volume 294. In some embodiments, engagement portion 206 is positioned within an inner volume that is defined by first body member 28. Engagement portion 206 may extend into first sub-volume 302 such that a portion of engagement portion 206 lies within first sub-volume 302 while another part of engagement portion 206 lies within second sub-volume 304. In some embodiments, engagement portion 206 intersects, crosses, extends through, etc., the transition between first sub-volume 302 and second sub-volume 304. In some embodiments, engagement portion 206 is completely positioned within first sub-volume 302. In other embodiments, engagement portion 206 is completely positioned within second sub-volume 304. In some embodiments, engagement portion 206 terminates at the transition between first sub-volume 302 and second sub-volume 304. For example, a longitudinally facing surface of engagement portion 206 that faces central axis 288 may intersect the transition between first sub-volume 302 and second sub-volume 304 (e.g., first axis 282). In some embodiments, ring member 202 is completely positioned within first inner volume 294.

Referring still to FIG. 4B, body member 44 can extend at least partially into first inner volume 294. In some embodiments, body member 44 extends longitudinally across or through second sub-volume 304, and terminates in first sub-volume 302. Inner body member 254 may be fixedly coupled or integrally formed with body member 44 and can be positioned completely within first sub-volume 302. In some embodiments, body member 44 extends longitudinally past first curved portion 262 and along at least a portion of straight portion 298 of spool 20.

Referring still to FIG. 4B, flange member 218 is positioned at least partially within first inner volume 294. Flange member 218 can include a radially extending portion 310, and a longitudinally extending portion 312. Radially extending portion 310 may extend longitudinally across first outer axis 270 (e.g., into second sub-volume 304, past the outer periphery of handle end 274 of spool 20). Longitudinally extending portion 312 may extend across the transition between first sub-volume 302 and second sub-volume 304.

Input shaft 32 may also extend into first inner volume 294 of spool 20. In some embodiments, input shaft 32 terminates or ends at the transition between first sub-volume 302 and second sub-volume 304. In other embodiments, input shaft 32 terminates within first sub-volume 302. In still other embodiments, input shaft 32 terminates within second sub-volume 304.

Advantageously, at least a portion of compound gear set 200 is positioned within first inner volume 294 of spool 20, thereby facilitating a more compact reel 12. The various components of compound gear set 200 may be translationally fixedly coupled with first body member 28, first structural member 40, and/or body member 44. Spool 20 may function as both a fishing line retrieval, storage, and let-out apparatus in addition to enclosing, protecting, etc., components of compound gear set 200. It should be understood that while spool 20 is shown and described as including first curved portion 262 and second curved portion 264, spool 20 can be a substantially hollow cylindrical, barrel, or spool member that does not include first curved portion 262 and second curved portion 264.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A baitcaster for retrieving a fishing line, the baitcaster comprising:
   a housing;
   a spool positioned at least partially within the housing, defining an inner volume, and comprising a spindle; and
   a compound gear set positioned at least partially within the inner volume of the spool, the compound gear set configured to receive input mechanical energy from a first shaft and transfer output mechanical energy through a second shaft to drive the spool and thereby retrieve the fishing line, the compound gear set comprising a plurality of input planet gears and a plurality of output planet gears.

2. The baitcaster of claim 1, wherein the spool is positioned between a first frame member and a second frame member, the spool rotatably supported by the first frame member and the second frame member.

3. The baitcaster of claim 1, wherein the first shaft and the second shaft are concentrically aligned along an axis of the baitcaster, wherein the spindle is positioned centrally within the inner volume of the spool, the spindle fixedly coupled with the spool through a central member, the central member extending radially outwards from the spindle and dividing the inner volume into a first inner volume and a second inner volume, the spool further comprising:
   a straight portion;
   a first curved portion positioned at a first end of the straight portion;
   a second curved portion positioned at a second end of the straight portion;
   wherein a transition between the straight portion and the first curved portion divides the first inner volume into a first sub-volume and a second sub-volume;
   wherein the compound gear set comprises:
      a ring gear; and
      a carrier configured to support the plurality of input planet gears and the plurality of output planet gears.

4. The baitcaster of claim 3, wherein the ring gear extends through the first sub-volume and terminates in the second sub-volume and the plurality of input planet gears are positioned at least partially within the first sub-volume and the second sub-volume.

5. The baitcaster of claim 3, wherein the plurality of output planet gears are positioned entirely within the second sub-volume and the carrier is positioned entirely within the second sub-volume.

6. The baitcaster of claim 3, wherein the compound gear set is configured to:
   receive input mechanical energy from the first shaft at the ring gear;

drive the input planet gears through an engagement between the input planet gears and the ring gear;

drive the output planet gears through a rotatable coupling between the input planet gears and the output planet gears;

drive the spool through an engagement between the second shaft and the output planet gears, wherein the second shaft is coupled with the spool at an opposite end of the spool.

7. The baitcaster of claim 1, wherein the compound gear set is positioned at a handle end of the baitcaster and the spool is driven through a coupling at an opposite end of the baitcaster.

8. A fishing rod comprising:
a rod; and
a baitcaster fixedly coupled with the rod, the baitcaster configured to retrieve a fishing line that extends along the rod, the baitcaster comprising:
  a housing;
  a spool positioned at least partially within the housing, defining an inner volume, and comprising a spool shaft; and
  a compound gear set positioned at least partially within the inner volume of the spool, the compound gear set configured to receive input mechanical energy from an input shaft and transfer output mechanical energy to the spool through an output shaft and the spool shaft to drive the spool to retrieve the fishing line, the compound gear set comprising a plurality of input planet gears and a plurality of output planet gears.

9. The fishing rod of claim 8, wherein the spool is positioned between a first frame member and a second frame member, the spool rotatably supported by the first frame member and the second frame member.

10. The fishing rod of claim 8, wherein the input shaft and the output shaft are concentrically aligned along an axis of the baitcaster, wherein the spool shaft is positioned centrally within the inner volume of the spool, the spool shaft fixedly coupled with the spool through a central member, the central member extending radially outwards from the spool shaft and dividing the inner volume into a first inner volume and a second inner volume, the spool further comprising:
  a straight portion;
  a first curved portion positioned at a first end of the straight portion;
  a second curved portion positioned at a second end of the straight portion;
  wherein a transition between the straight portion and the first curved portion divides the first inner volume into a first sub-volume and a second sub-volume; and
  wherein the compound gear set comprises:
    a ring gear;
    a carrier configured to support the plurality of input planet gears and the plurality of output planet gears; and
    an output shaft.

11. The fishing rod of claim 10, wherein the ring gear extends through the first sub-volume and terminates in the second sub-volume and the plurality of input planet gears are positioned at least partially within the first sub-volume and the second sub-volume.

12. The fishing rod of claim 10, wherein the plurality of output planet gears are positioned entirely within the second sub-volume and the carrier is positioned entirely within the second sub-volume.

13. The fishing rod of claim 10, wherein the compound gear set is configured to:

receive input mechanical energy from the input shaft at the ring gear;

drive the input planet gears through an engagement between the input planet gears and the ring gear;

drive the output planet gears through a rotatable coupling between the input planet gears and the output planet gears;

drive the spool through an engagement between the output shaft and the output planet gears, wherein the output shaft is coupled with the spool at an opposite end of the spool.

14. The fishing rod of claim 8, wherein the compound gear set is positioned at a handle end of the baitcaster and the spool is driven through a coupling at an opposite end of the baitcaster.

15. A gear set for a baitcaster, the gear set comprising:
a ring gear;
a plurality of input planet gears configured to engage with the ring gear;
a plurality of output planet gears rotatably coupled with the plurality of input planet gears;
a carrier configured to support the plurality of input planet gears and the plurality of output planet gears; and
an output shaft configured to drive a spool of the baitcaster;
wherein the gear set is configured to receive an input torque and drive the spool.

16. The gear set of claim 15, wherein the spool comprises a spool shaft, a straight portion, a first curved portion, and a second curved portion, positioned centrally within an inner volume of the spool, the spool shaft fixedly coupled with the straight portion through a central member extending radially between the spool shaft and the straight portion.

17. The gear set of claim 16, wherein the central member divides the inner volume into a first inner volume and a second inner volume and a transition between the straight portion and the first curved portion divides the first inner volume into a first sub-volume and a second sub-volume.

18. The gear set of claim 17, wherein:
the ring gear extends through the first sub-volume and terminates in the second sub-volume;
the plurality of input planet gears are positioned at least partially within the first sub-volume and the second sub-volume;
the plurality of output planet gears are positioned entirely within the second sub-volume; and
the carrier is positioned entirely within the second sub-volume.

19. The gear set of claim 15, wherein the gear set is configured to:
receive input mechanical energy from the input shaft at the ring gear;
drive the input planet gears through an engagement between the input planet gears and the ring gear;
drive the output planet gears through a rotatable coupling between the input planet gears and the output planet gears;
drive the spool through an engagement between the output shaft and the output planet gears, wherein the output shaft is coupled with the spool at the second opposite end of the spool.

20. The gear set of claim 15, wherein the output shaft extends centrally through the spool shaft and selectably rotatably couples with the spool shaft at the second end of the spool shaft, wherein the gear set is positioned at least partially within an inner volume of the spool of the baitcaster at a first end of the baitcaster and configured to receive the input torque through a handle at the first end of the baitcaster and drive the spool through a coupling between the output shaft and the spool at a second end of the baitcaster.

\* \* \* \* \*